United States Patent [19]
Seifert

[11] 3,841,692
[45] Oct. 15, 1974

[54] FORAGE WAGON

[76] Inventor: Lester H. Seifert, Park Ave., Kiel, Wis. 53042

[22] Filed: Sept. 25, 1972

[21] Appl. No.: 290,692

[52] U.S. Cl.................. 296/26, 296/137 B, 296/13
[51] Int. Cl............................................. B62d 33/08
[58] Field of Search ......... 296/26, 27, 24 R, 15, 14, 296/13, 7, 6, 137 R, 137 B

[56] References Cited
UNITED STATES PATENTS

| | | | |
|---|---|---|---|
| 1,941,162 | 12/1933 | Brown | 296/137 R |
| 2,797,124 | 6/1957 | Hauptli | 296/26 |
| 3,324,610 | 6/1967 | Adams | 296/137 B |
| 3,572,811 | 3/1971 | Kasten | 296/26 |
| 3,608,954 | 9/1971 | Lynd | 296/26 |

*Primary Examiner*—Philip Goodman
*Assistant Examiner*—John A. Carroll
*Attorney, Agent, or Firm*—Wheeler, Morsell, House & Fuller

[57] ABSTRACT

A forage wagon having a box with side walls and an elevatable roof, curtain walls depending from the roof edges adjacent the box side walls to bridge the gap between the side walls and the roof when the roof is elevated, said curtain walls having hinged connections to the roof edges on which the curtain walls are free to swing with respect to said roof in the course of adjusting the roof with respect to the box, said box having struts which project upwardly beyond the top of the box and means interconnecting the struts and roof in a substantially rigid assembly, independently of the curtain walls.

6 Claims, 10 Drawing Figures

PATENTED OCT 15 1974

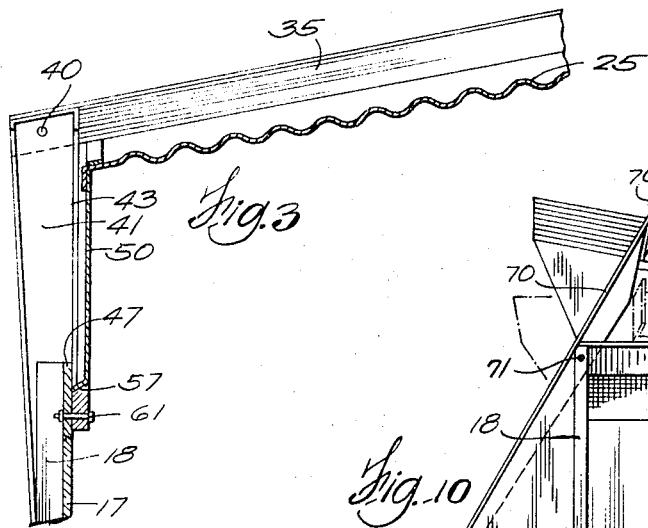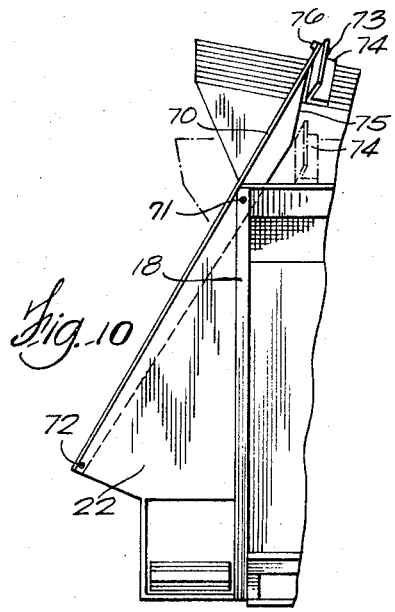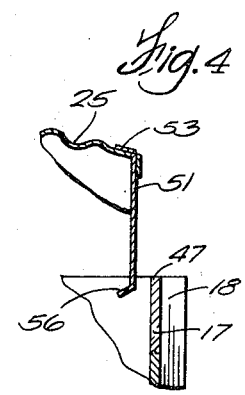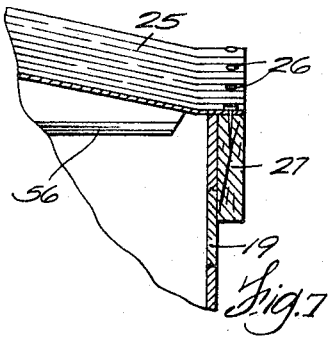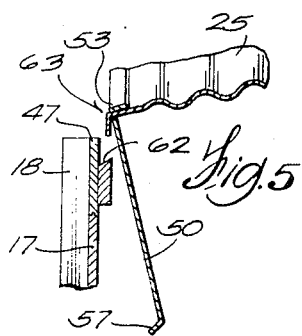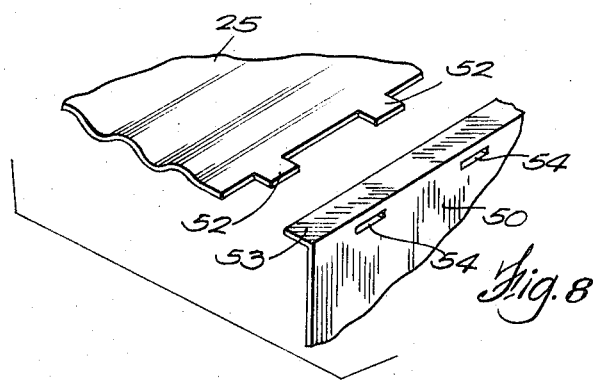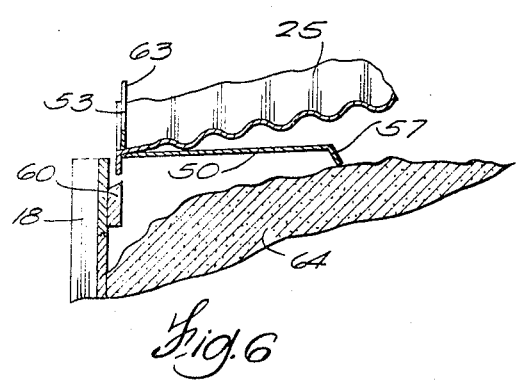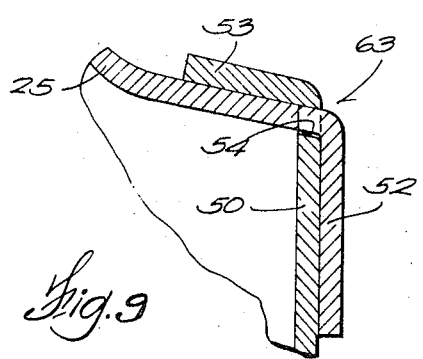

FORAGE WAGON

BACKGROUND OF THE INVENTION

U.S. Pat. No. 3,572,811 shows a farm wagon with a hinged roof and in which the roof is provided with side panels which rigidly extend from the side edges of the roof to support the roof in rigid elevated relation to the forage box. The rigidly extending side panels are relied on to transversely strengthen the sidewalls of the box.

SUMMARY OF THE INVENTION

In accordance with the present invention, the roof of the forage wagon is elevatable but has an improved structure for confining forage blown into the box and for supporting the elevated roof and rigidifying the assembly of the forage box and elevated roof. The gap between the elevated roof and the side walls of the box is bridged by curtain walls which are made of light weight, thin gauge material, such as sheet metal and which are not relied upon as a structural part of the box. The curtain walls simply confine the forage blown into the box. The roof is structurally supported in its elevated position and the assembly of elevated roof and box is strengthened and rigidified by struts extending upwardly from the side walls of the box and interconnected to cross beams extending transversely over the roof in a substantially rigid assembly, independently of the curtain walls. The curtain walls are hingedly connected to the edges of the roof so that they are flexible and may be swung inwardly with respect to the box side walls in the course of adjusting the roof with respect to the box.

Adjustment of roof position is facilitated by a pair of struts by which the forward end of the roof is supported from the box side walls. In one embodiment, these struts are pivotally connected to the box and cam against the foremost roof cross beam to function as lever arms by which the roof is raised and lowered manually between its various positions.

Other objects, features, and advantages of the invention will appear in the following disclosure.

DESCRIPTION OF THE DRAWINGS

FIG. 3 is a fragmentary cross section taken along the line 3—3 of FIG. 1.

FIG. 4 is a fragmentary cross section taken along the line 4—4 of FIG. 1.

FIG. 5 is a fragmentary cross section taken along the line 5—5 of FIG. 2, when the forage box is empty.

FIG. 6 is a fragmentary cross section similar to FIG. 5, but illustrating the curtain wall swung inwardly to rest on top of forage in the box.

FIG. 7 is a fragmentary longitudinal cross section taken through the rear end of the box.

FIG. 8 is an enlarged fragmentary perspective exploded view showing one manner of hingedly interconnecting the roof panel with a curtain wall side panel.

FIG. 9 is an enlarged fragmentary cross section taken through the hinged connection of a roof panel to a curtain wall side panel.

FIG. 10 is a fragmentary elevation of a modified embodiment in which the struts 41 remain stationary when the roof swings.

DESCRIPTION OF THE PREFERRED EMBODIMENT

Figure 1:
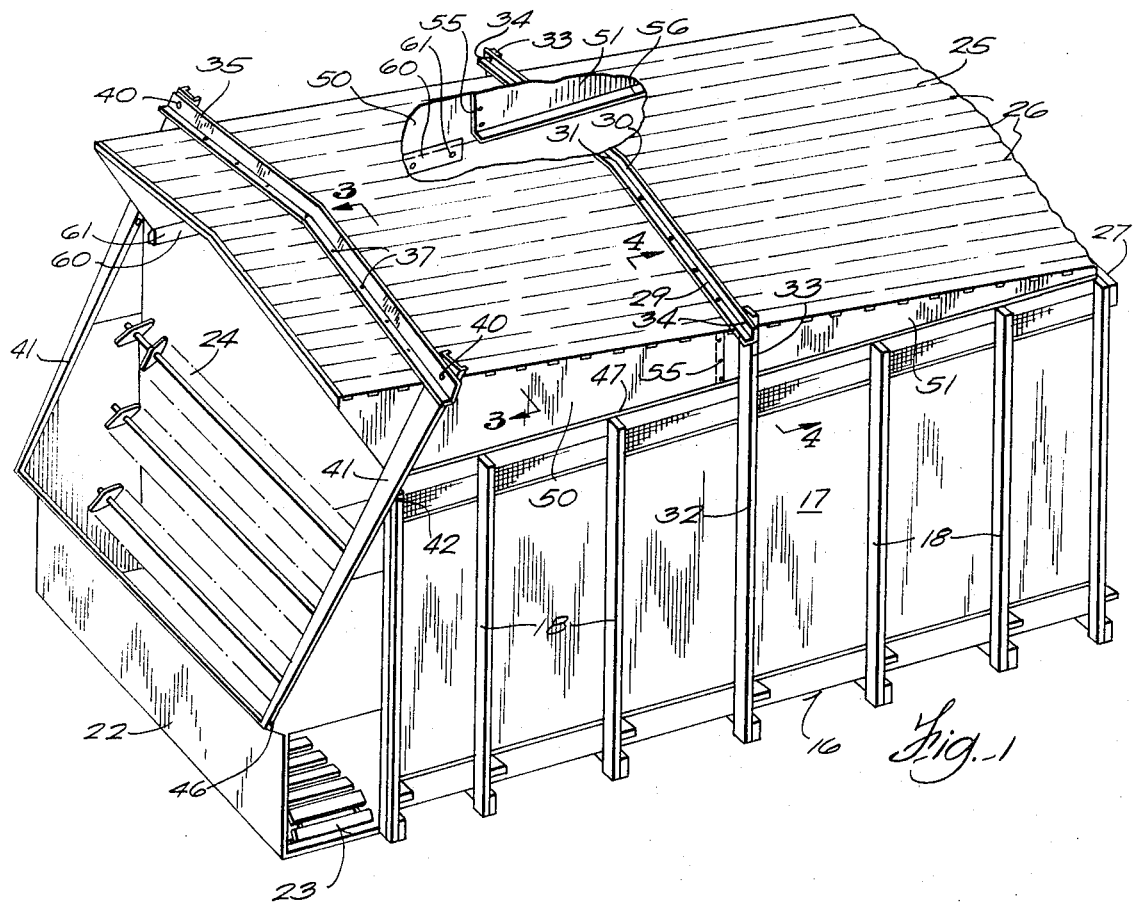
FIG. 1 is a perspective view of the forage box of a forage wagon embodying the present invention, with the roof in elevated position.

Although the disclosure hereof is detailed and exact to enable those skilled in the art to practice the invention, the physical embodiments herein disclosed merely exemplify the invention which may be embodied in other specific structure. The scope of the invention is defined in the claims appended thereto.

As is typical in this art, a forage wagon comprises a wheeled farm wagon 15 upon which a forage box 16 is mounted.

Box 16 comprises side walls 17, usually made up of wooden slats fastened to wooden upright supporting studs 18, and a similarly fabricated rear wall 19. At its forward end forage box 16 is provided with a beater housing 22 made of sheet metal. Housing 22 projects forwardly from the box 16 and houses along its lower portion a forage discharge conveyor such as a slat conveyor 23. Housing 22 contains rotary beaters 24, as is conventional.

The forage box is provided with a roof 25 which may be flat or slightly peaked or crowned along its medial longitudinal center line, as herein disclosed. In the exemplified embodiment, roof 25 comprises longitudinally corrugated sheet metal panels.

As best shown in FIG. 7, the rear margin of roof 25 is fastened to the box 16 by nails 26 or the like which are driven into a correspondingly peaked or crowned wooden cross header 27 or the like which spans transversely of the box at the top of its rear wall 19.

Midway of its length roof 25 is provided with a cross beam or angle iron 30 which is arched or peaked to correspond to the shape of the peaked roof 25. Beam 30 has a horizontal flange 29 fastened to the roof panel 25 by suitable bolts 31 or the like. Beam 30 extends slightly laterally beyond the edges of roof 25.

One pair 32 of the box studs 18 project upwardly beyond the top of the side walls 17 of the box 16, thus to provide posts 33 to which the cross beam 30 is releasably connected by bolts 34 when the roof is elevated.

Near its front edge roof 25 is provided with a forward cross beam or angle iron 35 having a lowermost flange 36 fastened to the roof panel 25 by bolts 37. Beam 35 is peaked to match the shape of peaked roof 25.

Figure 2:
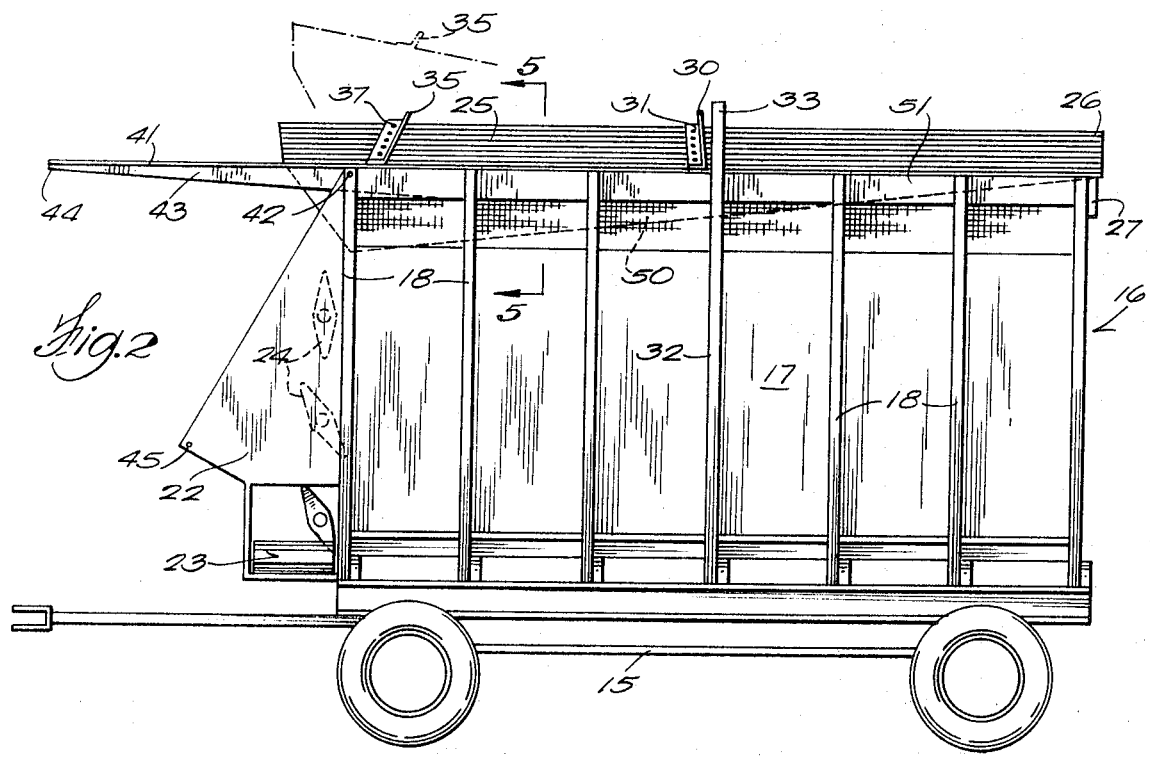
FIG. 2 is a side elevation of a forage wagon embodying the present invention, with the roof lowered.

The ends of beam 35 also project slightly beyond the roof edges and are releasably connected by bolts 40 to a pair of struts 41 which are pivotally connected by trunnion pins 42 to the front corner stud 18 of the box 16, thus to be swingable between its positions shown in FIGS. 1 and 2.

Struts 41 desirably taper downwardly and forwardly, as shown in FIG. 1. Each strut 41 has a flange 43 of substantial depth nested inside the box and into which the trunnions 42 are journaled. At its lowermost end each strut flange 43 is provided with a bolt hole 44 which aligns with a corresponding bolt hole 45 at the lower end of the beater housing 22, for reception of a retaining bolt 46 (FIG. 1) when the roof is elevated. In this position the roof 25 is elevated and is rigidly interconnected with the box 16 by the paired struts 41, paired post extensions 33 and cross beams 30, 35.

When it is desired to lower the roof, bolts 34, 40 and 46 are removed and struts 41 are swung about trunnions 42 from their position shown in FIG. 1 to their position shown in FIG. 2, whereupon the roof will descend to its position shown in FIG. 2. When it is desired to raise the roof, the struts 41 may be used as levers. Their lower free ends are pulled downwardly manually.

Their upper ends will then cam upwardly against the projecting ends of cross beam 35, thus to elevate or lift the roof 25 to its uppermost position shown in FIG. 1, at which point the releasable bolts 34, 40 and 46 will be replaced to anchor the roof 25 in elevated position and rigidify the assembly of the roof and the box side walls.

There is no hinge between the roof 25 and the box 16. Nails 26 fastened the sheet metal roof 25 fixedly to the header 27. However, as the front end of the roof is raised and lowered, the sheet metal of the roof will flex in an amount sufficient to permit this movement.

To bridge the gap between the edges of the roof 25 and the top edges 47 of the sides of box 16, load free curtain wall panels 50, 51 are provided. These panels are not required to function in a structural sense and are not required to support the roof or rigidify its assembly with the box side walls. The panels 50, 51 simply bridge the gap between the roof and the side walls and prevent loss of forage blown into the forage box through its open front end. Accordingly, curtain wall panels 50, 51 can be made of light weight, thin material, such as sheet metal.

Moreover, as it is desired to make these curtain wall panels 50, 51 flexible and swingable as hereinafter described, they are connected to the roof 25 on any convenient hinge mechanism. In the embodiment illustrated and as is best shown in FIG. 8, the edge of sheet metal roof 25 is provided with a series of projecting tabs 52. The curtain wall panels 50, 51 have top reenforcing flanges 53. The panels 50, 51 are pierced at 54 at spaced intervals corresponding to the spacing of the tabs 52. Accordingly, when the tabs 52 are thrust through the slits 54 the projecting tabs 52 can be bent downwardly as shown in FIG. 9, thus to interlock the side wall panels 50, 51 to the roof panel 25 on a hinge line 63 substantially coincident with the edge of the roof 25. This leaves the panels 50 free to be swung inwardly about the hinge line 63, as is illustrated in FIGS. 5 and 6.

While a single curtain wall panel running from the front to the rear edge of roof 25 would be satisfactory, I prefer to make the curtain wall panel in two pieces 50, 51, both of which are tapered from front to rear to conform to the shape of the gap left by the roof and the top of the side walls, as indicated in FIGS. 1 and 2. Where the two panels 50, 51 meet they are overlapped and are fastened together by bolts 55 (FIG. 1).

The lower edges of the panels 50, 51 are stiffened by flanges 57, 56. In the case of curtain wall panel 51, flange 56 is bent inwardly as is shown in FIGS. 1 and 4. In the case of curtain wall panel 50, flange 57 is bent outwardly as shown in FIGS. 3, 5 and 6.

When the roof is elevated, as shown in FIG. 1, I desirably fasten the lowermost edges of the curtain wall panels 50, 51 to the upper margin of the side walls 17 of the forage box. One way to do this is to simply use bolts to releasably fasten the parts together. However, in the embodiment illustrated in the drawings, I mount ledges 60 along both of the insides of the box and spaced slightly downwardly from the top edge 47 thereof. The ledges 60 are connected to the walls 17 by bolts 61 (FIG. 3) and desirably extend fore and aft of the box for a short distance near the front of the box, as illustrated in FIG. 1. Ledges 60 terminate ahead of the curtain wall panel 51.

The top edge of ledge 60 is slanted or beveled at 62 at an angle corresponding to the angle of flange 57 along the lower edge of curtain wall panel 50. Accordingly, when the roof is elevated, flange 57 may be interlocked behind the bevel 62 along the upper edge of ledge 60, as shown in FIG. 3, thus to secure the curtain wall panels in gap bridging position without need for manipulation of bolts., etc. Connection of the foremost panel 50 will hold the rearmost panel 51 in position without the necessity for extending the ledge 60 throughout the length of the box.

When the roof is lowered to its position shown in FIG. 2, the curtain wall panels 50 are disengaged from ledge 60 and may be swung inwardly about the hinge line 63, as shown in FIG. 5, thus to clear the ledge 60.

In the event that the box 16 is filled with forage 64, as shown in FIG. 6, the curtain wall panels may be swung inwardly to rest on top of the forage, as shown in FIG. 6, the hinge means 63 accommodating this swinging movement of the curtain wall panels.

FIG. 10 shows a modified embodiment in which struts 70 replace struts 41 of FIGS. 1 and 2. Struts 70 do not swing, but are fastened to the box by fasteners 71, 72. Cross beam 73 is similar to cross beam 35 of FIGS. 1 and 2, but has its flange 74 projecting rearwardly, instead of forwardly. Moreover, cross beam 73 is behind the struts 70, instead of forwardly thereof, as in FIG. 1.

The web 74 of strut 70 is relieved at cut line 75 to allow roof 25 to be lowered against the top of the side wall of the box, when curtain walls 51 are swung inwardly. When roof 25 is elevated, cross beam 73 may be attached to struts 70 by releasably bolts 76. In this embodiment, the struts 70 may remain in fixed position when adjusting the position of roof 25. Alternatively, struts 70 may be removed entirely by removing fasteners 71, 72. This will leave the space above the lowered roof 25 clear for passage of the wagon through a doorway or the like.

I claim:

1. A forage wagon having a box with side walls and an elevatable roof, curtain walls depending from the roof and adjacent the box side walls to bridge the gap between the side walls and the roof when the roof is elevated, said curtain walls having hinged connections to the roof on which the curtain walls are free to swing with respect to said roof in the course of adjusting the roof with respect to the box, said box being provided with struts which project upwardly beyond the top of the box and means interconnecting the struts and roof in a substantially rigid assembly independently of the curtain walls, said struts comprising a pair of struts pivotally connected to the front of the box, said struts having projecting lever ends.

2. The forage wagon of claim 3, said roof having a cross beam near its front end, said means interconnecting the cross beam and the said struts.

3. The forage wagon of claim 1 in combination with means releasably fastening the curtain walls to the box side walls when the roof is elevated.

4. The forage wagon of claim 1 in which the box has a cross beam at its rear end, said roof comprising sheet material having a rear margin fastened to said cross beam, said sheet material being flexible so as to bend when the front of the roof is elevated.

5. A forage wagon having a box with side walls and an elevatable roof, curtain walls depending from the roof and adjacent the box side walls to bridge the gap between the side walls and the roof when the roof is elevated, said curtain walls having hinged connections to the roof on which the curtain walls are free to swing with respect to said roof in the course of adjusting the roof with respect to the box, and means releasably fastening the curtain walls to the box side walls when the roof is elevated, said means comprising ledges extending along the box side walls, said curtain walls having lower edges which engage said ledges.

6. The forage wagon of claim 5 in which said ledges have inclined tops, the lower edges of the curtain walls being correspondingly inclined.

* * * * *